United States Patent [19]

Sayles et al.

[11] Patent Number: 4,629,364

[45] Date of Patent: Dec. 16, 1986

[54] METHOD AND SYSTEM FOR RELIEVING PIPELINE STRESS DUE TO FROST ACTION

[75] Inventors: Francis H. Sayles, Lebanon, N.H.; William T. Black, Irvine, Calif.; Earl P. Ellis, Eagle River, Ak.

[73] Assignee: The United States of America as represented by the Secretary of the Army, Washington, D.C.

[21] Appl. No.: 758,891

[22] Filed: Jul. 25, 1985

[51] Int. Cl.[4] ............................ F16L 57/00; E03B 7/10
[52] U.S. Cl. ............................................. 405/157; 138/32
[58] Field of Search ................ 405/56, 130, 131, 154, 405/157, 217, 258, 282; 52/167; 138/32, 105, 27

[56] References Cited

U.S. PATENT DOCUMENTS

| | | | |
|---|---|---|---|
| 3,638,438 | 2/1972 | Kinnucan | 405/157 |
| 3,650,119 | 3/1972 | Sparling | 405/157 X |
| 3,722,225 | 3/1973 | Empson | 61/72.1 |
| 3,747,355 | 7/1973 | Howard | 61/72.1 |
| 3,926,259 | 12/1975 | Perkins | 166/302 |
| 3,948,313 | 4/1976 | Best | 165/45 |
| 3,952,529 | 4/1976 | Lefever | 61/72.1 |
| 4,194,856 | 3/1980 | Jahns | 405/130 |
| 4,269,539 | 5/1981 | Hopke | 405/130 |
| 4,358,223 | 11/1982 | Jahns et al. | 405/157 |
| 4,464,082 | 8/1984 | Isaacs | 405/157 |
| 4,484,423 | 11/1984 | McClure | 52/167 |

FOREIGN PATENT DOCUMENTS

| | | | |
|---|---|---|---|
| 59-85036 | 5/1984 | Japan | 405/217 |
| 8799 | of 1913 | United Kingdom | 405/258 |

Primary Examiner—Cornelius J. Husar
Assistant Examiner—Nancy J. Stodola
Attorney, Agent, or Firm—Darrell E. Hollis

[57] ABSTRACT

A system and method for relieving frost-heaving stresses in a pipeline for transporting a product at a temperature less than 32° F. where said pipeline passes through frost-susceptible ground in a trench beneath the ground surface. Bedding supports the pipeline in the trench with its top substantially below the surface of the ground. A pair of relatively thin, elongated soil separators are installed in the trench, one along each side of the pipeline in parallel relation to the longitudinal axis of the pipeline. Each separator has a transverse width extending vertically upward substantially beyond the top of the pipeline and into backfill soil above the pipeline. Padding supports a lower edge of the shear separators adjacent to the pipeline and the separators each have an upper edge located substantially beyond this padding and beyond the top of the pipeline. A mass of the backfill is between upper portions of the shear separators and the shear separators are positioned so as to separate this backfill mass from laterally adjacent soil in response to upward movement of the pipeline due to the formation of a body of ice beneath the pipeline.

15 Claims, 4 Drawing Figures

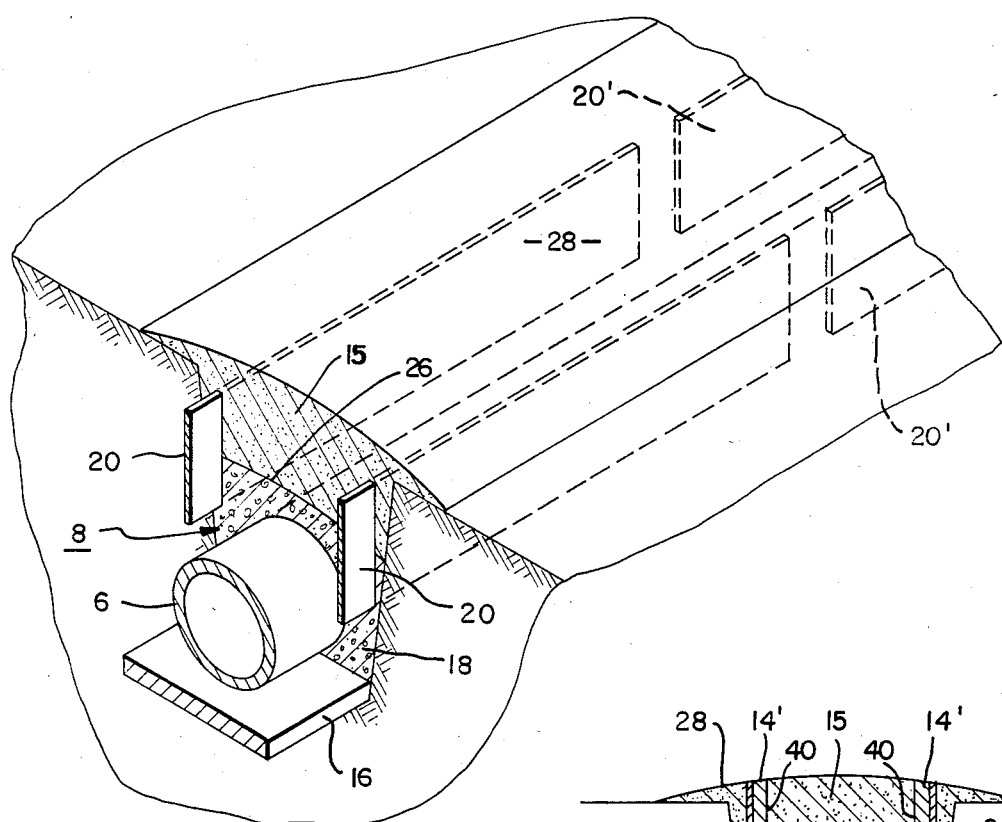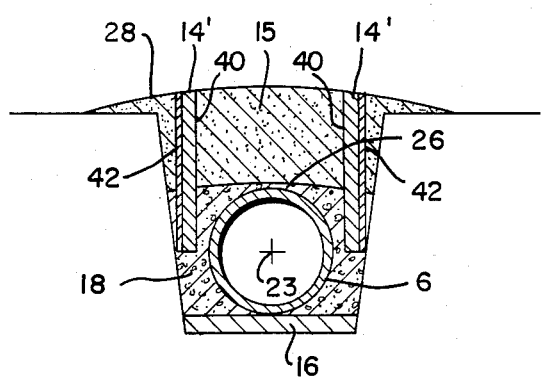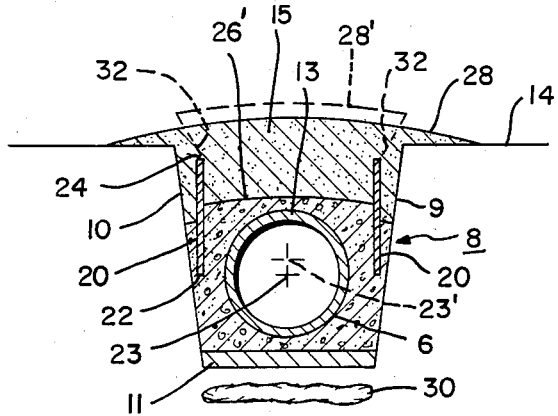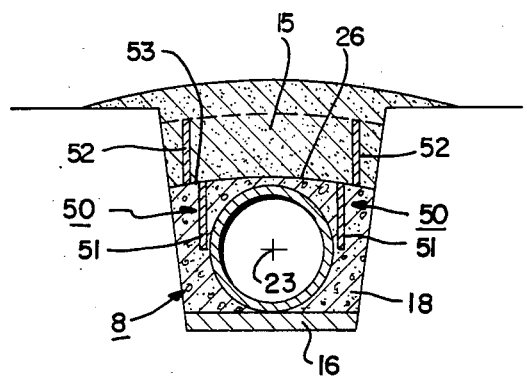

METHOD AND SYSTEM FOR RELIEVING PIPELINE STRESS DUE TO FROST ACTION

FIELD OF INVENTION

The invention relates to a method and system for preventing deformation of chilled pipelines which traverse frostsusceptible soils. More particularly, the invention pertains to installing elongated shear separators on opposite sides of the pipeline and parallel to its axis to separate backfill soil above the pipeline from laterally adjacent soils during frost action.

BACKGROUND OF THE INVENTION

Gas pipelines are used to transport natural gas from arctic regions to other regions in which the gas is to be used. These pipelines may be refrigerated where they pass through permafrost in order to prevent settlement of the pipeline during spring and summer thaws and other conditions related to thawing permafrost, such as soil erosion, icings and slope instability. It is also economically advantageous to chill high pressure gases in large diameter pipelines so as to increase gas density and thereby lower compression costs and reduce fluid flow pressure losses.

When such refrigerated pipelines traverse unfrozen ground or shallow permafrost where the soil is frost-susceptible, damage to the pipeline may occur due to what is known as "frost heaving". Frost heaving is caused by the migration of water toward a cold pipeline and the freezing of this water beneath the pipeline in sheets or "lenses" of almost pure ice. The resulting accumulation of ice can cause soil movement and corresponding pipe deformation, usually in the form of heaving the soil and pipeline upward above these bodies of ice. In addition, different soils heave at different rates which raises the possibility of differential heaving and uneven stress on the pipeline, which may be an even greater threat to pipeline integrity. For example, a pipeline may encounter a region of unfrozen frost-susceptible ground adjacent to a region of permafrost ground. When the frost-susceptible region of the ground freezes due to cooling by the pipeline, it will heave upward much more rapidly than will the surrounding permafrost region. The resulting stresses due to this differential heaving can cause deformation and, ultimately, rupture of the pipeline.

Bodies of ice tend to form beneath the pipeline primarily because this is usually the coldest region of the temperature field around the pipeline. As more water migrates to this region, it freezes and continues to expand and thicken the bodies of ice, which thereby exert increasing upward pressure tending to uplift the pipeline. As the bodes of ice grow in size beneath the pipeline, they move the soil and therefore the pipeline at a rate which depends on many factors, including the type of soil, the distribution of upward force which in turn depends upon the distribution of the thickening ice bodies, the availability of water and the rate of its migration, and the pressure and shear characteristics of the overburden which depends upon the type and amount of overburden material.

The top of a pipeline may be at least 30 inches below the surface of adjacent soil and diameters of large pipelines may range from about 36 to about 56 inches. Cooling and compressing stations may be located at intervals along such pipelines so that the gas can be maintained at a high pressure, such as about 1,000 to about 2,100 psig, and at temperatures between about 10° F. and about 30° F., more usually from about 15° F. to about 25° F.

Several methods have been proposed in the past for dealing with the problem of frost-heave of chilled gas pipelines. These include replacing frost-susceptible soil around the pipeline with non-frost susceptible soil and physically restraining the pipeline against soil heaving. Another proposed solution has been to heavily insulate the pipeline and to heat the soil beneath the pipeline in order to prevent formation of ice bodies beneath the pipeline.

While the methods of the prior art may provide some measure of relief from the problems of frost-heaving, each has serious disadvantages. Such prior art methods generally require specialized construction techniques, such as providing the pipelines with insulating material or individual heating units at numerous locations along the length of the pipeline. Where heaters are used, careful surveillance and frequent adjustments of heating rates may be required. Furthermore, such specialized methods and apparatus inherently involve relatively high costs that may prove to be prohibitive due to the length of a pipeline system needing frost-heave protection. There also may be hundreds of transitions from frozen to frost-susceptible ground associated with a major natural gas pipeline from an arctic region.

DISCLOSURE OF THE INVENTION

The method and system of the present invention alleviates the problems of frost-heaving associated with operating a chilled pipeline for natural gas or other chilled product at temperatures in the range of from about 10° F. to about 30° F. These low temperatures may be required for permafrost protection and efficient transportation of the chilled material. In discontinuous permafrost, or in any area where a chilled pipeline may traverse two adjacent soil deposits, uplift or heave due to the action of frost (accumulated ice) may occur at significantly different rates. Such differential rates in turn may cause detrimental strains to be produced in the pipeline. These strains are the result of the bending moment produced by the upward force from rapidly heaving soils relative to the downward restraint from slowly heaving soils. To reduce the potential of developing such detrimental strains, a portion of the soil backfilled above the springline of a pipeline can be separated from laterally adjacent soil by the present invention, which involves installing soil-shear separators adjacent to and along each side of the pipeline. The shear separators are in the form of relatively thin, narrow plates or sheets of rigid material, such as metal or plastic. At least two of these plates, one on each side of the pipeline, are arranged so as to run parallel to the pipeline and extend downwardly from an elevation at or a few inches below the surface of the backfill to the approximate depth of the springline (centerline) of the pipeline.

When the shear separators are properly placed, the mass of backfill soil above the pipeline and between the opposing shear separators will move upward with the pipeline as frost-heaving occurs. Accordingly, the shear separators provide planes of weakness along which the soil mass above the pipeline can readily shear upward past the adjacent bodies of soil outside the shear separators on either side of the pipeline. This reduces the force resisting uplift of the pipe to a force equal to the sum of the weight of the pipe, the weight of the backfill above the pipe and between the shear separators, the adhesion forces at the shear separators, and the friction forces between the shear separators and the abutting grains of soil.

The shear separators of the invention can be installed in different configurations for economy and ease of installation. For example, the shear separator along each side of the pipeline may be either continuous or discontinuous in either or both the longitudinal and vertical directions along the length of the pipeline. Where the shear separators are discontinuous in the longitudinal direction, the length of the gaps between the end of one separator section and the beginning of the next separator section should be small enough so that the average uplift resistance per unit length of the pipeline will not cause detrimental strains to occur when the pipeline is subjected to frost-heaving forces. In the vertical plane (lateral width direction), each shear separator can be continuous or can comprise two or more vertical sections off-set laterally from each other to facilitate transportation and installation.

The shear separators can be fabricated from a variety of materials, including those that are readily available commercially, such as coated steel plates, extruded plastic sheets, or wood sheets or strips impregnated with compositions resisting ice-bonding. Preferred are those materials which have a low adhesion to ice and a low frictional resistance to movement against soil. The material should be durable enough to withstand transportation and installation handling and to maintain the functionality of the shear separator until such time as pipeline movement due to frost-heave is no longer a problem. The potential for frost-heave movement dissipates as the depth of the frost bulb beneath the pipeline increases because the frost bulb may grow deep enough to develop a pressure at the freezing front sufficient to reduce the heave rate to a negligible amount.

The shear separator system of the invention in effect partitions the soil above the pipeline so as to economically mitigate the adverse effects of frost-heave by significantly reducing the uplift resistance opposing upward pipeline movement. The invention also offers the flexibility of installing the shear separators either during the placement of backfill soil to form the initial overburden or later after the overburden has been in place for some time. Installation during the original placement of backfill may be accomplished by placing the shear-separator plates or sheets against opposing walls of the pipeline trench and then introducing the backfill soil. After the backfill is in place, the shear-separators may be installed by trenching each shear-separator into place within the already existing backfill.

The method of installing the shear-separators after backfilling around and/or over the pipeline has been completed can be used as a remedial measure during operation of the pipeline. Thus, the separators may be installed to the approximate depth of the springline of the pipeline at any time after construction of the pipeline has been completed. Such backfilling may be located wherever pipe strains are observed to be occurring at magnitudes that could approach the integrity limits of the pipeline. In fact, trenching on each side of an existing pipeline down to the springline may reduce uplift resistance temporarily, even without installation of the soil-shear separators.

During the initial period of operation of a pipeline employing the present invention, frost-heave may lift the pipeline and the overburden soil between the soil-shear separators to an elevation higher than the surrounding ground surface. This elevated overburden soil may interrupt the surface drainage pattern of adjacent ground surfaces. As a result, surface drainage may require rerouting its flow or cutting through the elevated overburden at some time during operation of the pipeline.

BRIEF DESCRIPTION OF THE DRAWINGS

FIG. 1 is a schematic perspective view, in sectional elevation, showing a buried refrigerated gas pipeline having soil-shear separators installed in accordance with the invention.

FIG. 2 is a schematic cross-sectional end view of the embodiment of FIG. 1 illustrating the action of frost-heave.

FIG. 3 is a schematic cross-sectional end view illustrating the backfitting a pipeline with the shear separators of the invention after backfill soil is in place.

FIG. 4 is a schematic cross-sectional end view illustrating a modification of the invention with laterally offset soil-shear separators.

DESCRIPTION OF BEST MODE AND OTHER EMBODIMENTS

FIG. 1 illustrates one embodiment of the invention for preventing frost-heave damage to a pipeline 6 for conveying a chilled material, such as refrigerated natural gas. Pipeline 6 is installed in a trench 8 from which soil has been excavated to provide the trench along the path for laying the pipeline. Although the trench 8 may have other configurations, it is shown here as having sloped sidewalls 9 and 10 and a level bottom 11. The depth of trench 8 is such that the top 13 of pipe 6 is below the surface 14 of undisturbed ground adjacent to the trench.

The excavated trench 8 is first filled with a bedding material 16 onto which pipe 6 is laid. After the laying of pipe 6 on top of bedding 16, the trench is filled with a padding material 18, preferably to a depth such that the padding material surrounds the pipe on all sides except where it rests on the bedding. Both the bedding material and the padding material may have a low frost-heave potential so as to be somewhat heave resistant relative to the heave characteristics of the natural soil, some of which may be used as backfill 15 overlying pipe 6 and padding 18. In this regard, soil 15 may be referred to as a thawed, frost-susceptible soil through which the pipeline must pass. Trench 8 may extend to or below the maximum seasonal freeze detph of the natural soil.

While filling the trench with padding 18, there is installed a pair of soil-shear separators 20—20. Each separator 20 comprises a relatively thin and relatively narrow elongated sheet or plate of rigid material, such as metal or plastic. For example, plate 20 may comprise an elongated steel strip or band coated with a plastic composition resistant to the adhesion of ice. Alternatively, plate 20 may be a strip of extruded plastic having a composition that is adhesion resistant or "non-adhesive" relative to ice in contact with a surface of the plate. Padding 18 provides a means for supporting the shear separators in position adjacent to each side of the pipeline.

The plates 20—20 are positioned on opposite sides of pipe 6 so as to extend longitudinally in parallel relation to the centerline or longitudinal axis (springline) of the pipeline. Preferably, the plates 20—20 are each positioned on edge so as to extend laterally substantially in a vertical plane with a lower edge 22 at substantially the same elevation as the centerline 23 of the pipe, and an upper edge 24 projecting substantially beyond the uppermost elevation of padding 18.

After properly positioning the plates 20—20, these plates are held in position by introducing into the trench additional padding material until the top 26 of the padding is at the desired elevation above the top 13 of pipeline 6. The top of the padding is substantially below the elevation of upper edge 24 of each plate 20 and the filling of trench 8 is completed by backfilling with the previously removed soil 15 so as to provide a layer of backfill covering both the padding material 18 and the projecting portions of plates 20 above the uppermost level 26 of the padding material.

FIG. 2 illustrates the operation of the invention. When frost-heaving occurs as a result of the formation of a body 30 of ice in a region of the soil beneath the bottom 11 of trench 8, this ice formation causes movement of bedding 16 and that portion of padding 18 between the shear separators such that the pipe centerline moves from position 23 to position 23' as shown in FIG. 2. This movement in turn causes that portion of the backfill between the shear separators 20—20 to move upward by a corresponding amount, thereby shearing backfill 15 along lines of shear 32—32. As the backfill shears, a portion of the backfill surface 28 is raised to a new elevation as represented by broken line 28'. Accordingly, the portion of the backfill soil between shear-lines 32—32 and above the springline of the pipeline is separated from the adjacent soil laterally beyond shear-lines 32—32. In other words, the soil mass above the pipeline is caused to move upward by the frost-heaving action along shear planes of soil weakness caused by the shear separators. The padding between the shear separators also is heaved upward to a new elevation 26' as illustrated in FIG. 2. Thus, during frost-heaving action, portions of both the padding and the backfill move along the inside surfaces of the shear separators.

Since there is very little resistance to slippage along plates 20—20 and shear planes 32—32, the uplift resistance force is reduced by the shear separators substantially to a force equal to the sum of the weight of the pipe, the weight of the backfill and padding above the pipe between the shear separators and the friction and adhesion forces between the shear separators and the soil and/or ice abutting shear separator surfaces. These latter forces may be minimized by coatings or materials for plates 20—20 having low coefficients of friction and non-adhesive characteristics as described above. The decrease in uplift resistance per unit length of pipeline as provided by the soil-shear separators is sufficient to avoid the occurrence of detrimental strains in the pipeline due to significantly different frost-heaving forces at places where the chilled pipeline traverses adjacent soil deposits of different frost-heave potential. FIGS. 1 and 2 illustrate installation of the shear separators during original placement of the pipeline and its backfill. FIG. 3 illustrates an embodiment of the invention in which pipeline 6 is backfitted with soil-shear separators 42—42 after previous installation of the pipeline has been completed with backfill 15 already in place. In this embodiment, relatively narrow auxiliary trenches 40—40 are dug through backfill 15 and into padding 18 to the depth of approximately the centerline 23 of pipeline 6. Soil-shear separators 42—42 are then installed in auxiliary trenches 40—40, which are then refilled with the removed backfill material 14'—14'. In this embodiment, soil-shear separators 42—42 extend from approximately the centerline 23 of pipeline 6 to approximately the backfill surface 28, whereas the upper end 24 of soil separators 20—20 extended to several inches below backfill surface 28 (compare to FIGS. 2 and 3).

The shear separator plates may extend continuously in the vertical plane as shown in FIGS. 1 and 2 or may be discontinuous in the vertical plane as shown in FIG. 4. Where vertically discontinuous, the different vertical sections may extend in the same plane or be offset laterally as shown in FIG. 4. In this embodiment, each shear separator 50 comprises a lower section 52 and an upper section 52 laterally offset from each other by a distance 53 at the interface 26 between padding 18 and backfill 15. In this installation, the lower section 51 is placed in position upon filling the trench with padding 18 to the level of pipe centerline 23. The remainder of the padding material is then added to the trench until the upper level 26 of the padding is approximately even with the upper edge of lower plate sections 51—51. Upper plate sections 52—52 are then placed in position and the remainder of trench 8 is filled with back material 15 until the backfill material is even with or several inches above the upper edges of upper plate sections 52—52. The separator plates also may be longitudinally discontinuous in a horizontal direction as illustrated by the broken lines 20'—20' in FIG. 1.

INDUSTRIAL APPLICABILITY

The soil-shear separator system of the invention provides an economical mitigative method for reducing uplift resistance during frost-heaving of a chilled pipeline. This system offers the flexibility of installation either during the original placement of backfill of the pipeline or after the pipeline has been installed and backfill completed. The former installation is accomplished by placement of the shear-separator plates in the pipeline trench during its initial fill with padding material and backfill soil. The latter installation is accomplished by retrenching a relatively small portion of previously installed padding and backfill so as to plow into place in stages longitudinal sections of the shear-separator material. The shear-separators may be segmented longitudinally to provide sections of a size that can be easily shipped and installed on site. The shear separators also may be segmented into two or more vertical sections to facilitate further the ease of handling and installation, the number of vertical sections depending on the depth of padding and backfill between the top of the pipeline and the ground surface, which in turn is related to the depth of the trench in which the pipeline is installed.

What is claimed is:

1. A system for relieving frost-heaving stresses in a pipeline for transporting a product having a temperature less than 32° F. where said pipeline passes through frost-susceptible soil beneath its surface, said system comprising:

means for supporting said pipeline in a trench through said soil so that the top of said pipeline is substantially below the soil surface;

a pair of soil-shear separators each comprising a relatively thin, elongated plate, said separators being spaced laterally relative to each side of said pipeline and extending longitudinally along said pipeline in parallel relation to its longitudinal axis, and said separators extending transversely upward substantially beyond the top of said pipeline; and, support means for supporting each of said shear separators with a lower edge of said separators adjacent to said pipeline and an upper edge of said separators within a backfill portion of said soil lying in said trench above the top of said pipeline, said shear separators extending upward into said backfill portion so as to define therebetween a separable mass of backfill soil lying over said pipeline, and said shear separators being positioned in said trench so as to cause said separable mass to move upward relative to laterally adjacent soil in response to upward movement of said pipeline due to the formation of a body of ice beneath said pipeline.

2. The system of claim 1 in which each of said shear separators comprises a relatively thin, narrow sheet of rigid material having a lower edge engaged by said support means.

3. The system of claim 1 in which the lower edge of each of said plates is approximately at the same elevation as the centerline of said pipeline.

4. The system of claim 1 in which the upper edge of each of said plates is several inches below the surface of said backfill portion.

5. The system of claim 1 in which the upper edge of each of said plates is at substantially the same elevation as the surface of said backfill portion.

6. The system of claim 1 in which said support means comprises a padding material.

7. The system of claim 6 in which said support means includes a layer of bedding material beneath said padding material.

8. The system of claim 7 in which said bedding material and said padding material each have greater heave resistance than said soil.

9. The system of claim 1 in which each of said shear separators is discontinuous in a horizontal direction.

10. The system of claim 1 in which each of said shear separators is discontinuous in a vertical direction.

11. The system of claim 10 in which each of said sheer separators comprises a plurality of relatively thin, narrow sheets offset laterally from one another in different vertically extending planes.

12. The system of claim 11 in which each of said shear separators comprises two of said sheets one above the other, the upper of said sheets having an upper edge adjacent the surface of said backfill portion, and the lower of said sheets having a lower edge engaged by said support means.

13. The system of claim 1 in which each of said shear separators is made of a relatively rigid material having a low adhesion relative to ice and a low coefficient of friction relative to soil.

14. The system of claim 1 in which each of said shear separators is made of a relatively rigid material and is coated with another material having a low adhesion relative to ice and a low coefficient of friction relative to soil.

15. A method for relieving frost-heaving stresses in a pipeline for transporting a product at a temperature less than 32° F. where said pipeline passes through frost-susceptible ground beneath its surface, said method comprising the following steps:

removing soil from said ground so as to provide a trench of sufficient size to bury said pipeline so that its top is substantially below the surface of said ground;

supporting said pipeline in said trench so that its top is substantially below the elevation of said ground surface;

positioning a pair of relatively thin and elongated shear separators by positioning one of said shear separators longitudinally along each side of said pipeline in parallel relation to the longitudinal axis of said pipeline, each of said shear separators being spaced laterally relative to said pipeline and having a transverse width extending vertically upward substantially beyond the top of said pipeline;

providing a support for each of said shear separators with a lower edge of said shear separators adjacent to said pipeline and an upper portion of said shear separators extending upward substantially beyond the top of said pipeline; and, installing as backfill over said pipeline at least a portion of said removed soil, a portion of said backfill being placed over said pipeline and between said shear separators so as to provide a mass of said backfill separable from laterally adjacent soil, said shear separators being positioned in said trench so as to cause said separable mass between said separators to move upward relative to said lateral adjacent soil in response to upward movement of said pipeline due to the formation of a body of ice beneath said pipeline.

* * * * *